United States Patent
Uryu (10) Patent No.: US 8,669,731 B2
(45) Date of Patent: Mar. 11, 2014

(54) MOTOR DRIVE APPARATUS AND METHOD, AND ELECTRIC POWER STEERING SYSTEM USING THE SAME

(75) Inventor: Nobuhiko Uryu, Kariya (JP)

(73) Assignee: Denso Corporation, Kariya (JP)

( * ) Notice: Subject to any disclaimer, the term of this patent is extended or adjusted under 35 U.S.C. 154(b) by 363 days.

(21) Appl. No.: 13/134,972

(22) Filed: Jun. 22, 2011

(65) Prior Publication Data

US 2011/0316466 A1    Dec. 29, 2011

(30) Foreign Application Priority Data

Jun. 24, 2010 (JP) ................. 2010-143686
Dec. 14, 2010 (JP) ................. 2010-277964

(51) Int. Cl.
H02H 7/08 (2006.01)
(52) U.S. Cl.
USPC ............ 318/563; 318/460; 318/490; 318/609
(58) Field of Classification Search
USPC .......... 318/400.01, 400.02, 400.21, 434, 451, 318/460, 488, 489, 490, 563, 564, 609, 610, 318/700

See application file for complete search history.

(56) References Cited

U.S. PATENT DOCUMENTS

| | | | |
|---|---|---|---|
| 6,041,884 A | 3/2000 | Shimizu et al. | |
| 7,034,698 B2 * | 4/2006 | Matsumoto et al. | 340/575 |
| 7,091,684 B2 | 8/2006 | Kobayashi et al. | |
| 7,157,875 B2 * | 1/2007 | Kamen et al. | 318/434 |
| 7,806,225 B2 | 10/2010 | Itoh | |
| 7,813,089 B2 | 10/2010 | Suzuki | |
| 7,837,004 B2 | 11/2010 | Yasuda | |
| 7,978,471 B2 * | 7/2011 | Tokuyama et al. | 361/699 |
| 8,027,766 B2 | 9/2011 | Nozawa et al. | |
| 8,116,945 B2 | 2/2012 | Nozawa | |
| 2005/0241875 A1 | 11/2005 | Ta et al. | |
| 2009/0230901 A1 | 9/2009 | Amano | |
| 2009/0242293 A1 | 10/2009 | Tanaka et al. | |
| 2011/0043152 A1 | 2/2011 | Kidokoro et al. | |
| 2011/0156623 A1 * | 6/2011 | Nakamura et al. | 318/400.02 |

FOREIGN PATENT DOCUMENTS

| | | |
|---|---|---|
| JP | 06-344937 | 12/1994 |
| JP | 2003-26020 | 1/2003 |
| JP | 2005-304119 | 10/2005 |
| JP | 2008-99394 | 4/2008 |

OTHER PUBLICATIONS

Examination Report mailed Feb. 26, 2013 in the related U.S. Appl. No. 13/134,986.

(Continued)

*Primary Examiner* — Bentsu Ro
(74) *Attorney, Agent, or Firm* — Harness, Dickey & Pierce, PLC (57) ABSTRACT

When failure of an inverter or a coil set of one system of a motor drive apparatus having two systems, is detected, a power supply relay of the failing system is interrupted. At the same time, a control circuit sets a same maximum current limitation value as set before detection of failure. When an IG switch is in an ON-state and a steering toque detection value exceeds a predetermined threshold value thereafter, a vibration component, which has a predetermined amplitude and frequency, is added to a current command value so that a steering wheel is vibrated in a direction of rotation so that a driver is cautioned to notice the failure surely.

6 Claims, 6 Drawing Sheets

(56) References Cited

OTHER PUBLICATIONS

U.S. Appl. No. 13/134,971, filed Jun. 22, 2011, Uryu.
U.S. Appl. No. 13/134,986, filed Jun. 22, 2011, Uryu.
U.S. Appl. No. 12/997,449, filed Dec. 23, 2010, Satou et al.
U.S. Appl. No. 12/997,489, filed Dec. 23, 2010, Nakamura et al.
Office action dated Feb. 15, 2013 in co-pending U.S. Appl. No. 13/134,971.
Office Action issued Jan. 8, 2013 in corresponding Japanese Application No. 2010-277964 with English translation.
Office Action issued Jan. 8, 2013 in corresponding Japanese Application No. 2010-277965 with English translation.
Office Action issued Dec. 10, 2012 in related U.S. Appl. No. 13/134,971.

* cited by examiner

FIG. 6

MOTOR DRIVE APPARATUS AND METHOD, AND ELECTRIC POWER STEERING SYSTEM USING THE SAME

CROSS REFERENCE TO RELATED APPLICATION

This application is based on and incorporates herein by reference Japanese patent applications No. 2010-143686 filed on Jun. 24, 2010 and No. 2010-277964 filed on Dec. 14, 2010.

FIELD OF THE INVENTION

The present invention relates to a motor drive apparatus and method, which drive an electric motor by a plurality of inverters and a plurality of coil sets, and an electric power steering system using the same.

BACKGROUND OF THE INVENTION

A motor drive apparatus disclosed in the following patent document 1 has a plurality of inverters. In this motor drive apparatus, when one of the plurality of inverters fails, electric power is stopped from being supplied from a failing inverter to a plurality of coil sets and electric power is supplied to the coil sets from normal inverters other than the failing inverter. Thus, even when one of the inverters fails, the motor can be continuously operated by driving the motor by only the normal inverters.

[Patent document 1] JP 2005-304119A

In a motor drive apparatus, a combination of one inverter and one coil set, which is paired to such an inverter, forms one power supply system. According to a prior art technology disclosed in patent document 1, when power supply to a failing system is stopped in case of detection of failure, output of the failing system falls at the same time as the occurrence of failure. As a result, motor operation rapidly changes immediately after the failure. In case that the motor drive apparatus is used, for example, as an electric power steering system for a vehicle, the rapid change in motor output will cause vehicle operation change, which a driver do not intend. It is possible to continuously compensate for the loss in motor output by the normal systems other than the failing system. The inverters in the normal systems will be loaded excessively and overheats. Although it is also possible to increase power capacity of inverters to protect the inverters from being overloaded, the inverters become large-sized and expensive.

The applicant of the present application proposed technologies, which counter the foregoing problem by two patent applications. One is a U.S. patent application Ser. No. 12/977,449 (JP application No. 2009-295533). This technology provides a motor drive apparatus, which suppresses operation changes caused by stopping an operation of a failing system upon occurrence of a failure in one of power supply systems. This is a solution to solve the problem that a rapid operation change occurs immediately after failure.

In case this technology is used in an electric power steering system of a vehicle, the operation change is suppressed by controlling inverters operating normally to compensate for loss of power, which has been supplied by a failing system, temporarily at the time of occurrence of failure. Since a driver will not sense any change in steering operation in such a case, the driver will not notice the failure.

Under a condition that one of two power supply systems of motor drive apparatus is in failure, the driver notices the failure and generally takes the vehicle to a repair shop at the earliest time. This technology intends to continue to drive the motor by one normal system so that the driver will be able to drive the vehicle to the repair shop with the same steering feeling as before the occurrence of failure. If the driver continues to use the vehicle without noticing the failure, the normal system will also fail sooner or later and steering torque will not be power-assisted at all in the end.

The second one is a U.S. patent application Ser. No. 12/977,489 (JP application No. 2009-295534). This technology provides an electric power steering system, which equalizes a maximum current command value commanded to an inverter (power converter) of a normal system after occurrence of failure to a maximum current supply value having been supplied to coils by the inverter of the normal system before occurrence of failure. This is a solution to solve the problem that the inverter of the normal system will be overloaded and overheat if it is controlled to maintain even after the occurrence of failure the same total output as before the occurrence of failure.

For example, in case that one of two systems fails, the maximum current command value is reduced to one-half from that of two systems. Thus, the inverter of the normal system is protected from being overloaded. Further, a change in the feeling of steering operation is provided to the driver by reducing the steering torque output to one-half. It is also proposed as an auxiliary measure to call driver's attention by a warning light or a buzzer at the time of failure.

The output required in the electric power steering system is reduced, however, to about one-third of output required when the vehicle is at rest, when travel speed of the vehicle becomes higher than 4 km/hr. For this reason, even if the steering assist torque output is reduced to one-half during travel of the vehicle, the driver will not sense change in steering operation feeling until a steering wheel is turned a large angle. The driver will thus not notice the occurrence of failure.

SUMMARY OF THE INVENTION

It is an object of the present invention to provide a motor drive apparatus and method, which will surely cause a driver to notice a failure when any one of inverters or coil sets fails.

According to one aspect of the present invention, a motor drive apparatus and a motor drive method are provided. The motor includes a plurality of coil sets for an electric power steering system of a vehicle. The motor drive apparatus includes a plurality of inverters for converting DC power of a DC power source to AC power for the motor. The inverters are paired with the coil sets of the motor. The motor drive apparatus interrupts power supply to the inverter that corresponds to the inverter or the coil set, which is detected as having failure. The motor drive apparatus drives the motor by only the inverter operating normally. The motor drive apparatus adds a predetermined vibration component of a predetermined amplitude and frequency to a current supplied from the inverter operating normally to the motor.

BRIEF DESCRIPTION OF THE DRAWINGS

The foregoing and other objects, features and advantages of the present invention will become more apparent from the following detailed description made with reference to the accompanying drawings. In the drawings.

DETAILED DESCRIPTION OF THE PREFERRED EMBODIMENT

Embodiments of the present invention, which are used in an electric power steering system for assisting steering operation of a vehicle, will be described below with reference to the drawings.

(First Embodiment)

Figure 1:
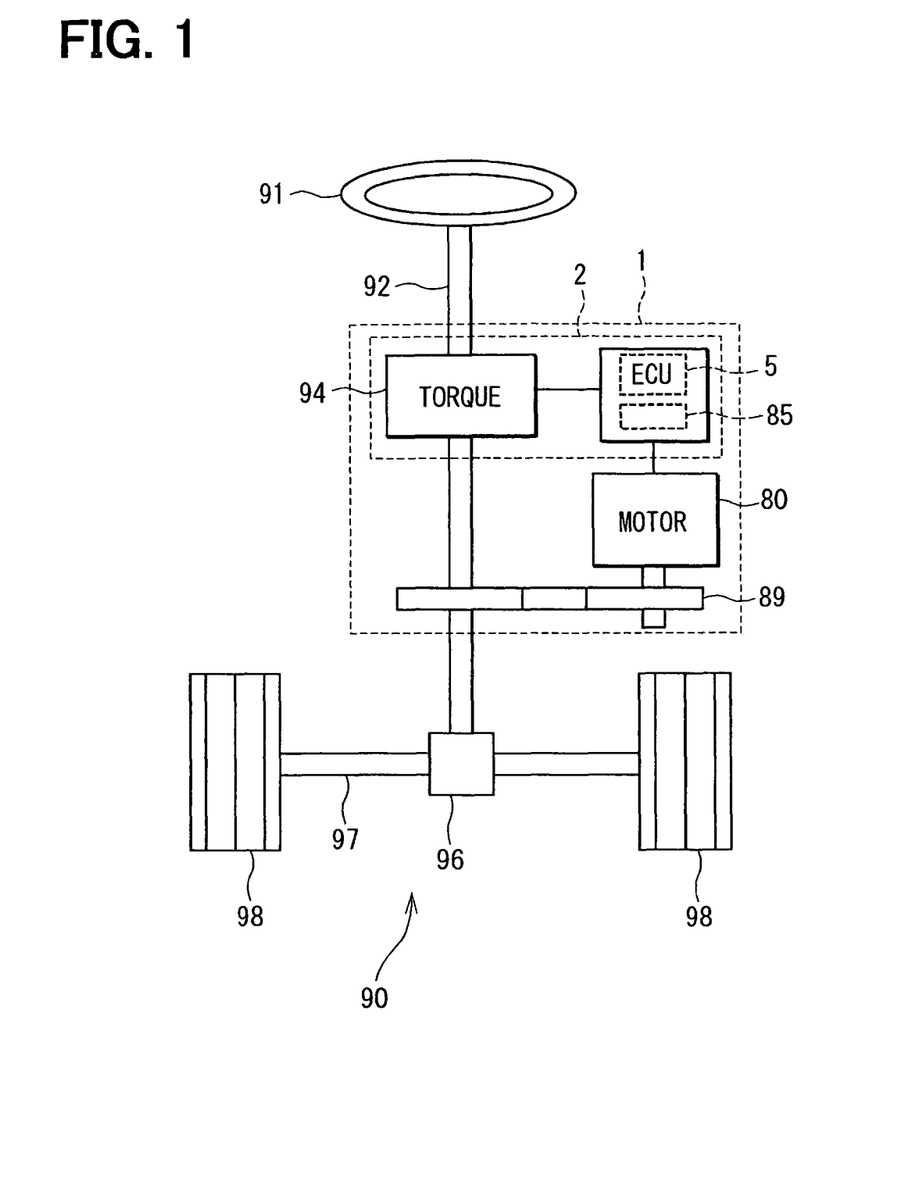
FIG. 1 is a schematic diagram of an electric power steering system, which uses a motor drive apparatus according to a first embodiment of the present invention.

Referring first to FIG. 1, an electric power steering system 1 provided in a steering system has a torque sensor 9, which detects steering torque, on a steering shaft 92 coupled to a steering wheel 91. A pinion gear 96 is attached to an end of the steering shaft 92. The pinion gear 96 is meshed with a rack shaft 97. A pair of tire wheels 98 is coupled to both ends of the rack shaft 97 rotatably through tie rods and the like.

When a driver turns a steering wheel 91, the steering shaft 92 coupled to the steering wheel 91 rotates. Rotary motion of the steering shaft 92 is converted into linear motion of the rack shaft 97 by the pinion gear 96. The pair of wheels 98 is steered by an angle corresponding to an amount of the linear motion of the rack shaft 97.

The electric power steering system 1 is provided with an electric motor 80 for generating steering assist torque, a reduction gear 89 for reducing and transferring rotation of the motor 80 to the steering shaft 92, and a motor drive apparatus 2. The motor 80 is a three-phase brushless motor and rotates the reduction gear 89 in forward and reverse directions. The reduction gear 89 is a motive power transfer device. The motor drive apparatus 2 includes an electronic control unit (ECU) 5, which includes, in addition to the torque sensor 94, a rotation angle sensor 85 for detecting a rotation angle of the motor 80 and other sensors. According to this construction, the electric power steering system 1 generates steering assist torque for assisting steering operation of the steering wheel 91 and transfers it to the steering shaft 92.

Figure 2:
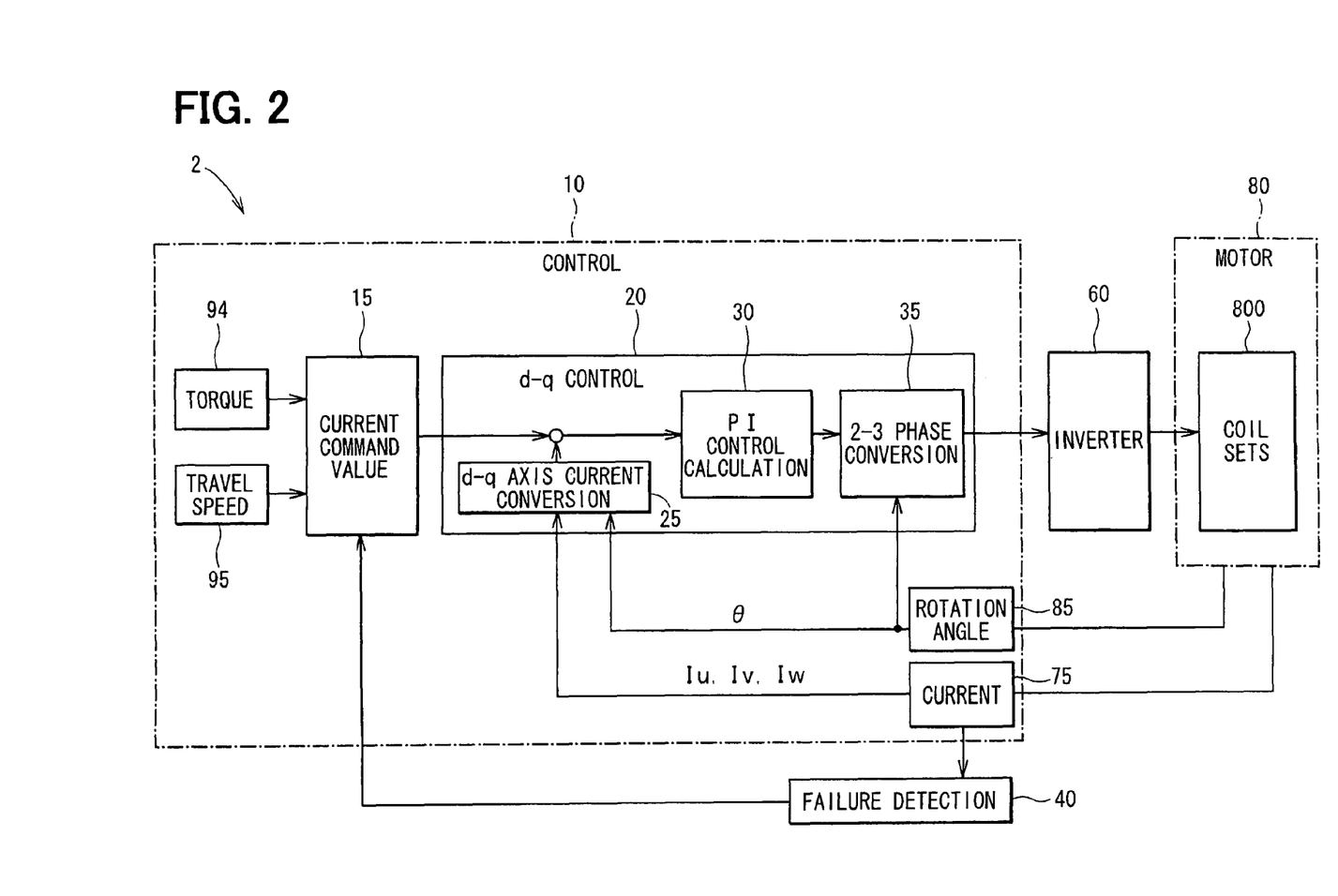
FIG. 2 is a control block diagram of the motor drive apparatus according to the first embodiment of the present invention.

As shown in FIG. 2, the motor drive apparatus 2 includes a control circuit 10, a failure detection circuit 40 and an inverter circuit 60 as the ECU 5. The control circuit 10 includes a current command value calculation section 15 and a d-q control section 20. The control circuit 10 is shown as including a current sensor 75, a vehicle travel speed sensor 95 and the like in addition to the rotation angle sensor 85 and the torque sensor 94. The current command value calculation section 15 inputs a steering torque detection value of the torque sensor 94 and a travel speed detection value of the travel speed sensor 95, and outputs a current command value to the d-q control section 20. The current command value calculation section 15 further inputs a failure detection output of the failure detection circuit 40 to change the current command value when the failure detection output is applied.

The d-q control section 20 is formed of a d-q axis current conversion section 25, a PI control calculation section 30 and two-phase to three-phase (2-3 phase) conversion section 35. The d-q axis conversion section 25 D-Q-converts phase current detection values Iu, Iv and Iw of the current sensor 75 to a d-axis current and a q-axis current based on a motor electric angle θ, which is detected by the rotation angle sensor 85 and fed back. The d-axis current and the q-axis current are parallel and orthogonal to the direction of magnetic flux, respectively. The d-axis current and the q-axis current outputted by the d-q axis conversion section 25 are fed back to the current command value calculation section 15. The PI control calculation section 30 calculates an output value by proportional-and-integral control based on a difference between the command value and the detection value. The two-phase voltage command value outputted by the PI control calculation section 30 is converted into three-phase voltages of U-phase, V-phase and W-phase by the two-phase to three-phase conversion section 35 and those voltages are outputted to the inverter circuit 60. The electric angle θ detected by the rotation angle sensor 85 is also fed back to the two-phase to three-phase conversion section 35.

AC power generated by the inverter circuit 60 is supplied to the coil sets to drive the motor 80. The current sensor 75 detects output currents of the inverter circuit 60 phase by phase. The rotation angle sensor 85 detects the rotation angle from a center position of the steering wheel by detecting the motor electric angle θ.

Figure 3:
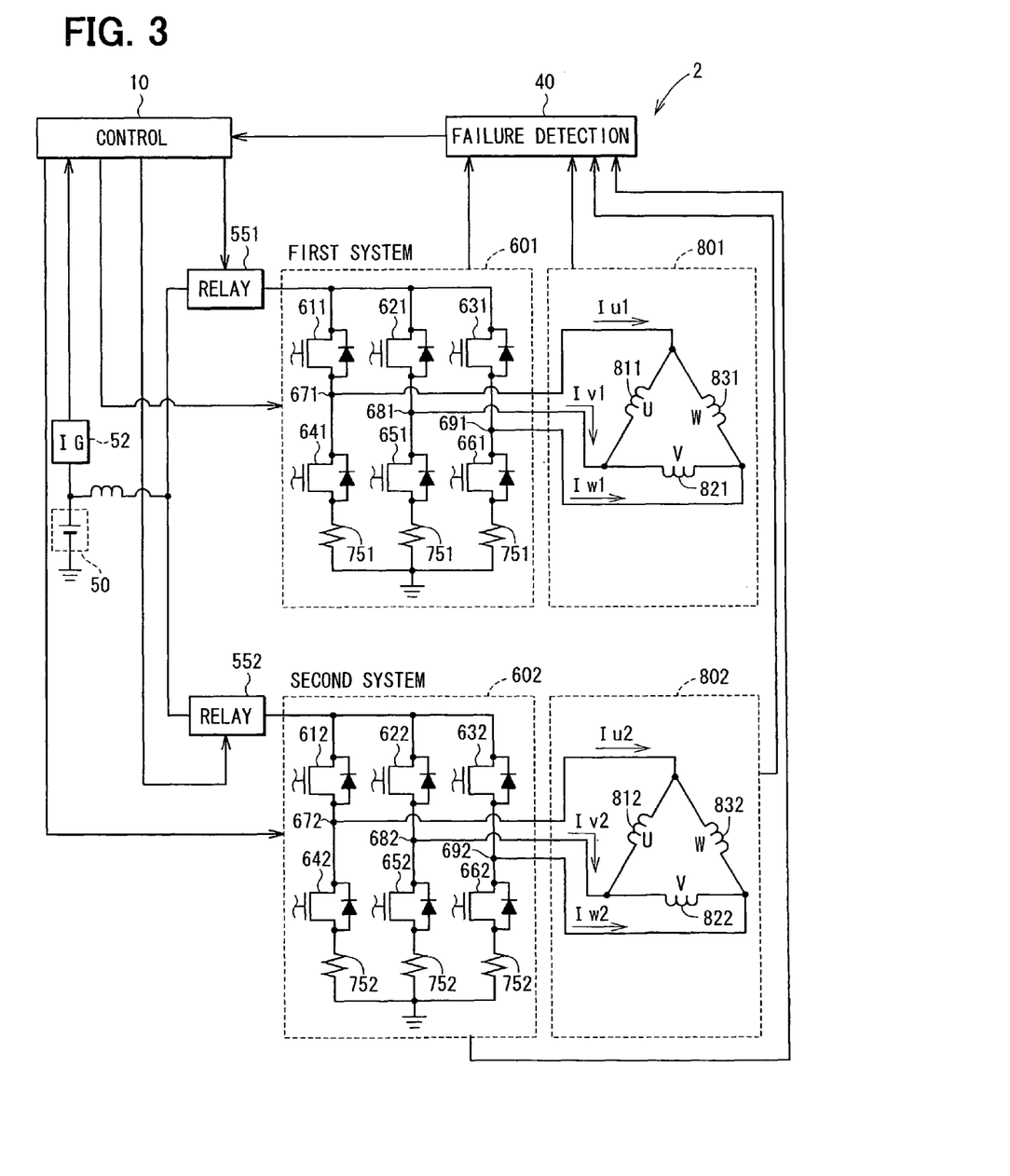
FIG. 3 is a circuit diagram of the motor drive apparatus according to the first embodiment of the present invention.

FIG. 3 shows an exemplary circuit of the motor drive apparatus 2 for two power supply systems. "System" means a pair of one inverter and one coil set (set of coils) corresponding to one inverter. The first system is formed of an inverter 601 and a coil set 801. The second system is formed of an inverter 602 and a coil set 802. The motor drive apparatus 2 may be formed of N systems (N is an integer equal to 3 or more). In such a case, similar systems are added in parallel up to as many as N-th system in FIG. 3.

As shown in FIG. 3, a DC power source 50 of the motor drive apparatus 2 supplies electric power in parallel to the inverter 601 of the first system and the inverter 602 of the second system. Power supply relays 551 and 552 conduct or interrupt power supply from the DC power source 50 to the inverters 601 and 602, respectively. The power supply relays 551 and 552 is a power supply conduction and interruption section.

Since the inverter and the coil set in each of the first system and the second system are the same, the first system is described as an example. Structural elements of the second system correspond to those of the first system. The structural elements in the first system have the last number "1" of reference numerals, and the structural elements of the second system have the last number "2" of reference numerals.

The inverter 601 is a voltage-type PWM inverter, which generates three-phase AC power of U-phase, V-phase and W-phase from DC power. The inverter 601 is formed of a bridge circuit including high-side FETs 611, 621, 631, which are switching elements at the power source voltage side, and low-side FETs 641, 651, 661, which are switching elements at the ground side.

The high-side FETs 611, 621, 631 have drains, which are connected to a power supply line at an output side of the power supply relay 551, and sources, which are connected to drains of the low-side FETs 641, 651, 661. The low-side FETs 641, 651, 661 have sources, which are grounded through shunt resistors 751, respectively. Each of the shunt resistors 751 is a part of the current sensor 75 shown in FIG. 2 and detects phase currents Iu1, Iu2, Iu3 flowing in a U1-coil 811, a V1-coil 821, a W1-coil 831, respectively, which will be described later.

In the U-phase, the source of the high-side FET 611 and the drain of the low-side FET 641 are connected to a U1-terminal 671. The U1-terminal 671 is connected to one end of the U1-coil 811. In the V-phase, the source of the high-side FET 621 and the drain of the low-side FET 651 are connected to a V1-terminal 681. The V1-terminal 681 is connected to one end of the V1-coil 821. In the W-phase, the source of the high-side FET 631 and the drain of the low-side FET 661 are connected to a W1-terminal 691. The W1-terminal 691 is connected to one end of the W1-coil 831.

The motor 80 has magnetic poles on a rotor and the three-phase coils, which are U1-coil 811, V1-coil 821 and W1-coil 831, on a stator. Here, for example, "U1-coil" means a U-phase coil of the first system. The U1-coil 811, the V1-coil 821 and the W1-coil 831 are connected in a Δ-shape to form the coil set 801. The coil set 801 is supplied with the three-phase AC power from the inverter 601 and drives the motor 80 jointly with the coil set 802 of the second system. Thus, the inverter 601 and the coil set 801 are paired in the first system, and the inverter 602 and the coil set 802 are paired in the second system.

The failure detection circuit 40 detects failure of the inverter 601 or the coil set 801 by detecting the phase currents Iu1, Iv1, Iw1, which flow from the phase terminals 671, 672, 673 to the coils 811, 821, 831, respectively, by the shunt resistors 751. The control circuit 10 sets the current command values as target current values, which are to be outputted from the inverter 601 to the coil set 801 based on the signal from the failure detection circuit 40, the rotation angle detection value of the rotation angle sensor 85, the steering torque detection value of the torque sensor 94, the travel speed detection value of the travel speed sensor 95 and the like. An ignition switch 52 is turned on and off by manipulation of a driver on an ignition key. The on/off signal of the ignition switch 52 is inputted to the control circuit 10.

Figure 4:
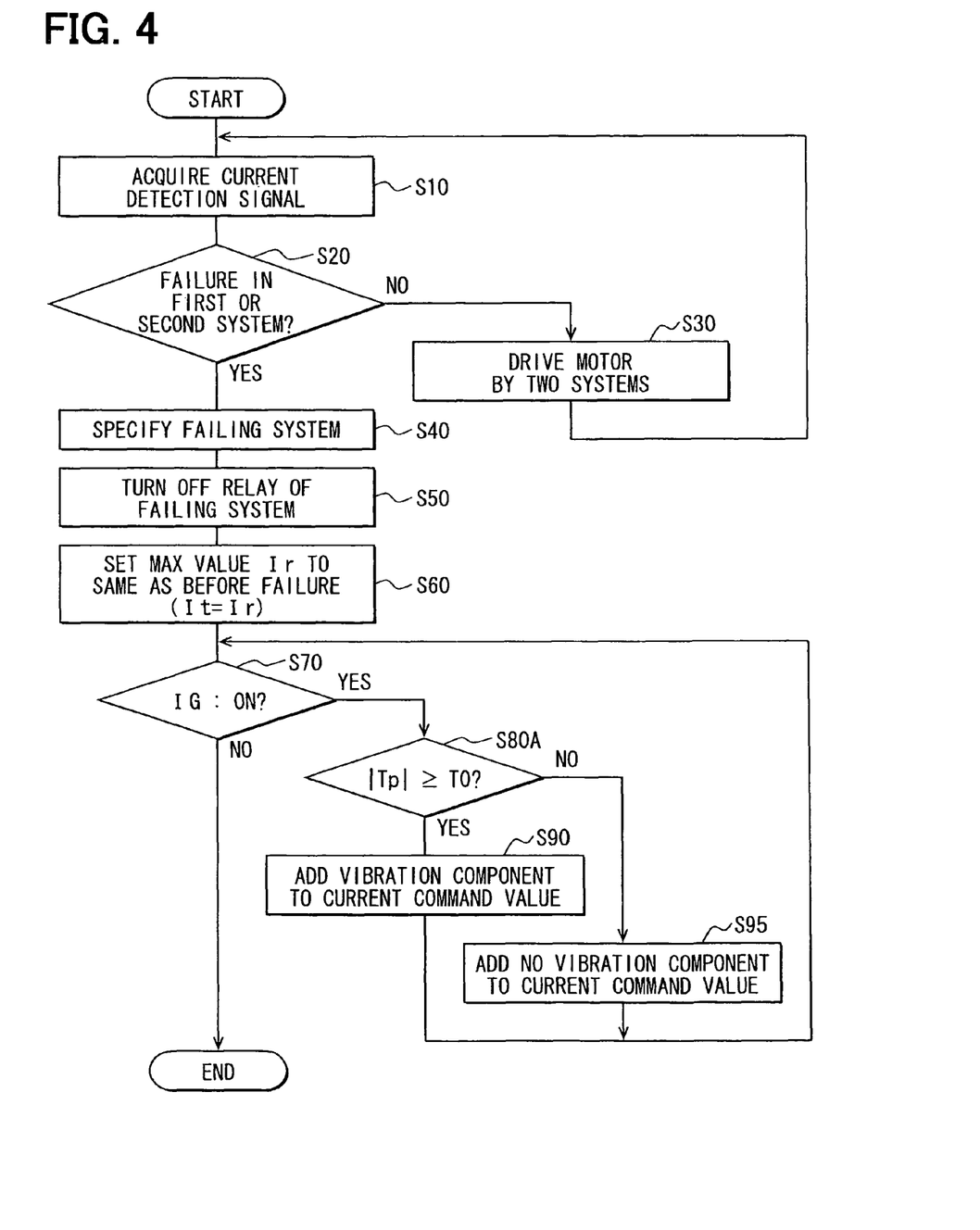
FIG. 4 is a flowchart of failure detection of the motor drive apparatus according to the first embodiment of the present invention.

Operation of the motor drive apparatus 2 at failure detection time will be described next with reference to a flowchart in FIG. 4 and time chart in FIG. 5. In the following description of flowchart, S indicates a step.

While the motor 80 is being driven, the failure detection circuit 40 acquires the current detection signal of the current sensor 75 at S10. The failure detection circuit 40 checks at S20 whether failure of the inverter 601, 602 or the coil 801, 802 has been detected. If NO (no failure) at S20, the control circuit 10 drives the motor 80 by two systems in the same manner as in the normal case at S30. If YES (failure) at S20, the control circuit 10 specifies at S40 a failing system, which is not operating normally.

It is assumed in the following description that the inverter 601 or the coil set 801 of the first system is in failure. At S50, the control circuit 10 interrupts current supply from the DC power source 50 to the inverter 601 by turning off the power supply relay 551 provided in the first system, which is in failure. A current supply limitation value for the inverter 601 becomes 0 after this time.

At next S60, the control circuit 10 sets a current supply limitation value for the inverter 602 of the second system, which is normal, to a maximum current limitation value Ir for only the inverter 602 of the second system. The maximum current limitation value Ir corresponds to the maximum current limitation value, which the inverter 602 of the second system has supplied to the coil set 802 before detection of the failure. Before detection of the failure, the same maximum current limitation value has been provided for the inverter 601 of the first system. That is, the total It of the maximum current limitation values of the two systems is twice as large as the maximum current limitation value Ir of the second system, which is one system. Therefore, by processing of S60, the output of the motor drive apparatus 2 for driving the motor 80 is reduced to one-half, because the maximum current limitation value for the second system is not changed but maintained as before.

It is checked at S70 whether the IG switch 52 is in the ON state. If NO, which indicates that the vehicle is at rest, the operation at the time of failure detection is terminated. If YES at S70, S80A is executed. At S80A, it is checked whether an absolute value of a steering torque Td detected at the present time is equal to greater than a predetermined torque threshold value T0. It is determined that the steering torque value is positive and negative when the steering wheel 91 is turned in the clockwise direction (right turn) and the counter-clockwise direction (left turn), respectively. That is, if the absolute value of the steering torque Td is equal to or greater than the torque threshold value T0, the steering wheel 91 is being rotated in the clockwise or counter-clockwise direction with torque, which is equal to or greater than the torque threshold value T0. The torque threshold value T0 is set to for example 1.5 Nm.

If YES at S80A, S90 is executed. At S90, a predetermined vibration component is added to the current command value so that the steering wheel 91 is vibrated in the direction of rotation at the time of steering operation of a driver. This processing is vibration application processing. As shown in FIG. 5, the vibration component is set to a current value, which corresponds to the steering torque of 0.5 Nm in amplitude and the frequency is set to 20 Hz. The torque, 0.5 Nm, corresponds to a torque, which will not impede the steering operation of the driver and applies vibration that the driver will surely sense. The frequency, 20 Hz, is a frequency sufficiently higher than 0 to 2 Hz, at which the driver normally operates the steering wheel.

Figure 5:
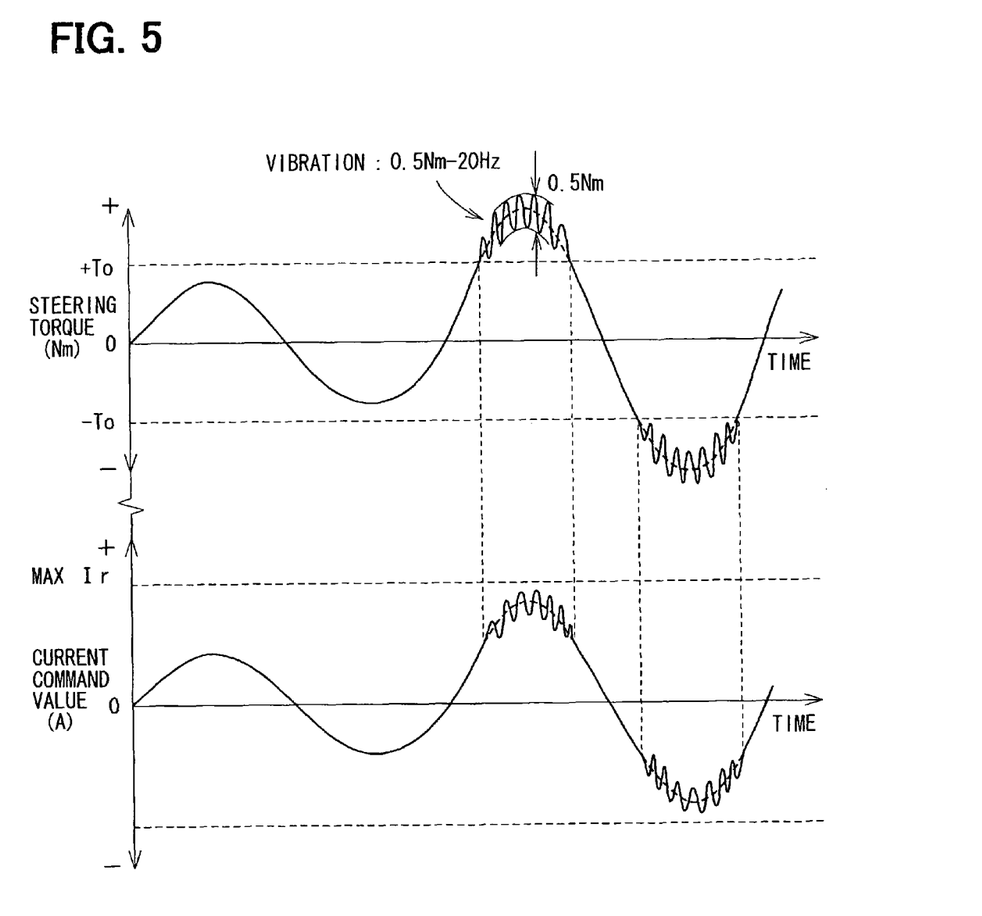
FIG. 5 is a waveform of a steering torque and a current command value at the time of failure detection of the motor drive apparatus according to the first embodiment of the present invention.

The vibration generated by vibration application processing is superposed on the steering torque as shown in FIG. 5. The waveform of the steering torque corresponds to the waveform of the current command value. By vibrating the steering wheel 91 by vibration application processing, the driver is caused to notice occurrence of failure surely so that the driver is motivated to take the vehicle to a repair shop at the earliest time.

If NO at S80A, however, S95 is executed. NO at S80A corresponds to a case, in which the steering wheel 91 is maintained at a fixed angle, for example center position, or turned only slightly for adjustment as if the vehicle is traveling on a straight road or on a gentle curve having a generally fixed radius of curvature. If the steering wheel 91 is vibrated under such a situation, even slight vibration is likely to cause unpleasant feeling to the driver. Therefore, vibration application processing is not performed. At S95, the vibration component, which is to be added to the current command value, is set to 0. Following S90 or S95, it is checked again at S70 whether the IG switch 52 is in the ON-state or OFF-state.

In case that the driver has to operate the steering wheel 91 to take the vehicle to the repair shop, about one-half of the steering assist torque, which is one-half of the two systems provided at normal operation time (non-failure time), can be used as long as the steering torque Td is less than the threshold value T0. In this situation, the steering wheel 91 is not vibrated. If the steering torque Td is equal to or greater than the threshold value T0 like in the case of turning left or right, the steering wheel 91 can be operated by using the steering assist torque, which is about one-half of the normal time. The steering wheel 91 will vibrate in this situation. However, since the vibration component is set not to impede the steering operation, the driver can drive the vehicle without unpleasant feeling.

(Advantage)

Advantages of the motor drive apparatus 2 according to the above-described first embodiment will be described next.

(1) In the operation after the failure of the inverter 601 or the coil set 801 of the first system is detected, the control circuit 10 performs the vibration application processing by which the predetermined vibration component is added to the current command value for the inverter 602 of the second system operating normally and vibrates the steering wheel 91 in the rotating direction when the driver operates the steering wheel 91. Thus, the driver can be caused to notice occurrence of failure surely. It can thus be avoided that, as a result of continued use of the vehicle without, noticing the failure, the second system also fails and assisting the steering torque cannot be attained.

(2) The control circuit 10 performs vibration application processing only when the detection value Td of the steering torque is equal to or greater than the torque threshold value T0, and does not perform it when the steering torque detection value Td is less than the torque threshold value T0. Thus, as long as the steering wheel position is maintained or turned only for correcting the steering wheel position a little, the driver is released from feeling unpleasantness. Further, by limiting performance of the vibration application processing, control load of the control circuit 10 can be reduced.

(3) The maximum current limitation value Ir, which is the upper limitation value of the current supply limitation value for the second inverter 602 operating normally, is set if desired to a value, which is similar to the maximum current limitation value having been supplied to the coil set 802 from the inverter 602 of the second system before the detection of failure. The inverter 602 can thus be operated with the same or less load as before the detection of failure. The inverter 602 can be protected from overheating due to excessive loading.

(Second Embodiment)

Figure 6:
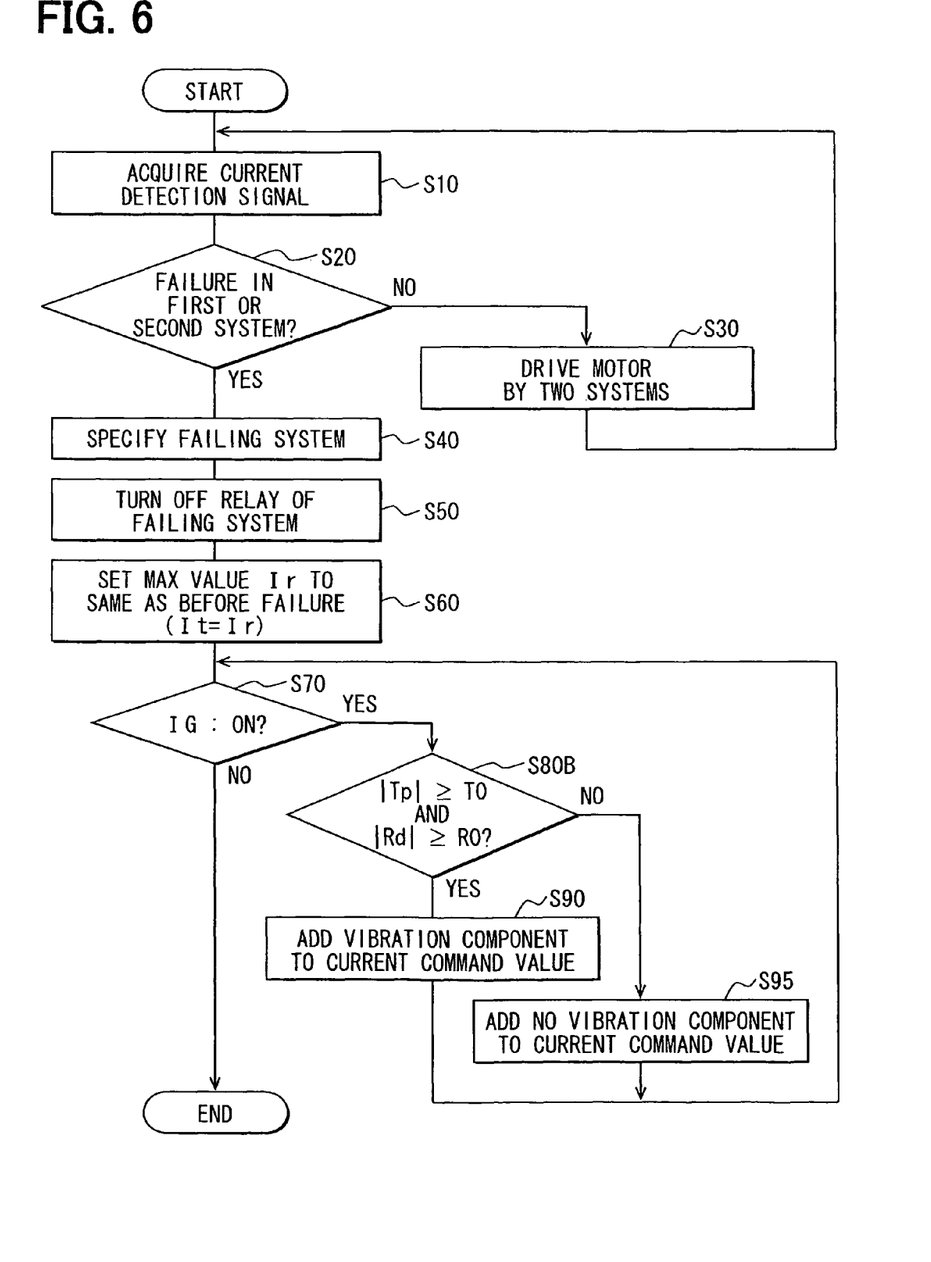
FIG. 6 is a flowchart of failure detection of a motor drive apparatus according to a second embodiment of the present invention.

Operation of the motor drive apparatus 2 at the failure detection time according to a second embodiment will be described next with reference to a flowchart in FIG. 6. The second embodiment is the same as the first embodiment except that S80B is executed in place of S80A executed in the first embodiment (FIG. 4).

It is checked at S80B whether the absolute value of steering torque Td detected at the present time is equal to or greater than the torque threshold value T0 and an absolute value of a rotation angle Rd of the steering wheel 91 detected at the present time is equal to or greater than a predetermined rotation angle threshold value R0. The torque threshold value T0 is set to 1.5 Nm, for example. The rotation angle threshold value R0 is set to 5° for example. The rotation angle detection value Rd of less than 5° corresponds generally to traveling on a straight road with the steering wheel rotation angle at about the center position. At the time of traveling on the straight road, the steering torque detection value Td also becomes less than 1.5 Nm. If YES and NO at S80B, the same processing S90 and S95 as the first embodiment are executed, respectively.

When the steering wheel 91 is maintained at a fixed angle or turned only slightly for adjusting or correcting an angle, it is preferred not to perform the vibration application processing. The case, in which the vibration application processing is not desired, can thus be surely excluded by checking the present travel condition based on the steering torque detection value Td and the rotation angle detection value Rd.

(Other Embodiment)

(A) In the foregoing embodiments, the case, in which the steering torque detection value Td is equal to the torque threshold T0, is included in the case, in which the steering torque detection value Td is greater than the torque threshold T0. It is also practically possible to include the case, in which the steering torque detection value Td is equal to the torque threshold value T0, in the case, in which the steering torque detection value Td is less than the torque threshold value T0. This is also true for the rotation angle.

(B) In the foregoing embodiments, the maximum current value limitation value, which is the upper limitation value of the current supply limitation value, is set to be about the same as the normal-time maximum current limitation value, which has been outputted to the coils by the inverter operating normally before the failure detection. However it is also possible to set a different maximum current limitation value. This maximum current limitation value is preferably set to a value, which will not overload the inverter.

(C) In the foregoing embodiments, performance of the vibration application processing is determined based on the steering torque detection value Td and the rotation angle detection value Rd. The vibration application processing may be performed always irrespective of the steering torque detection value Td or the rotation angle detection value Rd, when any one of the systems fails.

(D) In the second embodiment, the performance of vibration application processing is determined based on a combination of check results of the steering torque detection value Td and the rotation angle detection value Rd. It is possible to determine the performance of vibration application processing based on the check result of only the rotation angle detection value Rd.

(E) In the foregoing embodiments, it is possible not to check whether the IG switch is in the ON-state or the OFF-state.

(F) It is also possible to call driver's attention by caution section such as a warning light and buzzer in addition to the vibration application processing at the time of failure detection.

(G) In the foregoing embodiments, the control circuit 10 and the failure detection circuit 40 may be integrated in one circuit and respective functions may be performed by a programmed computer. "Circuit" is therefore understood as meaning a function or similar arithmetic operation parts.

The present invention is not limited to such embodiments as described above and may be implemented in other different embodiments without departing from the spirit of the invention.

What is claimed is:

1. A motor drive apparatus for driving a motor, which includes a plurality of coil sets, the motor drive apparatus comprising:

a plurality of inverters for converting DC power of a DC power source to AC power, the inverters being paired with the coil sets of the motor;

a failure detection circuit for detecting failure in the inverters or the coil sets by detecting currents flowing in the inverters or the coil sets;

a power interruption section capable of interrupting power supply from the DC power source to the inverters;

a control circuit for setting a current command value of a current outputted from each inverter to a paired coil set and setting a current supply limitation value, which is an upper limitation value of the current command value; and a torque sensor for detecting steering torque, by which a driver operates a steering wheel; wherein the control circuit performs a vibration application processing only when a steering torque detection value outputted by the torque sensor exceeds a predetermined torque threshold value;

when the failure detection circuit detects the failure in any one of the inverters or the coil sets, the power supply interruption section interrupts power supply to the inverter that corresponds to the inverter or the coil set, which is detected as having failure, and the control circuit performs the vibration application processing, which adds a vibration component having predetermined amplitude and frequency to the current command value for the inverter operating normally.

2. The motor drive apparatus according to claim 1, wherein:

the control circuit sets the current supply limitation value to a predetermined maximum current limitation value for the inverter, which is operating normally and receiving the power supply; and the predetermined maximum current limitation value is generally the same as a current, which the inverter operating normally has supplied to the paired coil set before detection of the failure.

3. An electric power steering system comprising:

a motor for assisting steering operation of a driver;

a power transfer section for transferring rotation of the motor to a steering shaft; and the motor drive apparatus according to claim 1.

4. The motor drive apparatus according to claim 1, wherein:

the vibration application processing is performed on the steering wheel.

5. A motor drive apparatus for driving a motor, which includes a plurality of coil sets, the motor drive apparatus comprising:

a plurality of inverters for converting DC power of a DC power source to AC power, the inverters being paired with the coil sets of the motor;

a failure detection circuit for detecting failure in the inverters or the coil sets by detecting currents flowing in the inverters or the coil sets;

a power interruption section capable of interrupting power supply from the DC power source to the inverters;

a control circuit for setting a current command value of a current outputted from each inverter to a paired coil set and setting a current supply limitation value, which is an upper limitation value of the current command value; and a rotation angle sensor for detecting a rotation angle of a steering wheel from a central position of the steering wheel; wherein the control circuit performs a vibration application processing only when a rotation detection angle outputted by the rotation angle sensor exceeds a predetermined rotation angle threshold value;

when the failure detection circuit detects the failure in any one of the inverters or the coil sets, the power supply interruption section interrupts power supply to the inverter that corresponds to the inverter or the coil set, which is detected as having failure, and the control circuit performs the vibration application processing, which adds a vibration component having predetermined amplitude and frequency to the current command value for the inverter operating normally.

6. A motor drive apparatus for driving a motor, which includes a plurality of coil sets, the motor drive apparatus comprising:

a plurality of inverters for converting DC power of a DC power source to AC power, the inverters being paired with the coil sets of the motor;

a failure detection circuit for detecting failure in the inverters or the coil sets by detecting currents flowing in the inverters or the coil sets;

a power interruption section capable of interrupting power supply from the DC power source to the inverters; and a control circuit for setting a current command value of a current outputted from each inverter to a paired coil set and setting a current supply limitation value, which is an upper limitation value of the current command value; wherein when the failure detection circuit detects the failure in any one of the inverters or the coil sets, the power supply interruption section interrupts power supply to the inverter that corresponds to the inverter or the coil set, which is detected as having failure, the control circuit performs vibration application processing, which adds a vibration component having predetermined amplitude and frequency to the current command value for the inverter operating normally;

the vibration is caused in a rotation direction of the steering wheel; and the vibration component has an amplitude corresponding to about 0.5 Nm and a frequency corresponding to about 20 Hz.

* * * * *